United States Patent
Ando

(10) Patent No.: US 8,064,139 B2
(45) Date of Patent: Nov. 22, 2011

(54) APPARATUS FOR MANUFACTURING OPTICAL ELEMENT, METHOD OF MANUFACTURING OPTICAL ELEMENT, OPTICAL ELEMENT, AND IMAGING DEVICE

(75) Inventor: Masaki Ando, Chiba (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/657,988

(22) Filed: Jan. 29, 2010

(65) Prior Publication Data

US 2010/0202060 A1    Aug. 12, 2010

(30) Foreign Application Priority Data

Jan. 30, 2009   (JP) .............................. P2009-019661

(51) Int. Cl.
   *G02B 3/00*    (2006.01)
   *G02B 27/10*   (2006.01)

(52) U.S. Cl. ........................................ 359/642; 359/628

(58) Field of Classification Search .................. 359/642, 359/619, 627–630; 264/1.7, 2.5, 2.7
See application file for complete search history.

(56) References Cited

U.S. PATENT DOCUMENTS

| | | | |
|---|---|---|---|
| 3,560,076 A | | 2/1971 | Ceppi |
| 5,345,336 A | * | 9/1994 | Aoyama et al. ............... 359/628 |
| 5,694,246 A | * | 12/1997 | Aoyama et al. ............... 359/619 |
| 6,147,732 A | * | 11/2000 | Aoyama et al. ............... 349/112 |
| 2005/0140033 A1 | | 6/2005 | Jiang et al. |

FOREIGN PATENT DOCUMENTS

| | | |
|---|---|---|
| JP | 50003656 B | 2/1975 |
| JP | 2004288845 A | 10/2004 |
| JP | 2006-130841 A | 5/2006 |
| JP | 2007-516870 T | 6/2007 |
| JP | 2008183833 A | 8/2008 |
| JP | 2008230027 A | 10/2008 |

OTHER PUBLICATIONS

Office Action from Japanese Application No. 2009-019661, dated Oct. 28, 2010.

* cited by examiner

*Primary Examiner* — Mohammed Hasan
(74) *Attorney, Agent, or Firm* — Lerner, David, Littenberg, Krumholz & Mentlik, LLP

(57) ABSTRACT

An apparatus for manufacturing an optical element includes: a flexible stamper having a transfer portion transferring a predetermined shape and having changeable curvature; a stamper holding mechanism holding the stamper; an element holding mechanism holding an optical element having a convex or concave curved surface, the curved surface serving as a transferred surface to which the shape of the transfer portion of the stamper is transferred; a curvature changing mechanism changing the curvature of the stamper in accordance with curvature of the transferred surface of the optical element; and a moving mechanism moving at least one of the stamper held by the stamper holding mechanism and the optical element held by the element holding mechanism in a direction in which the transfer portion of the stamper moves away from or closer to the transferred surface of the optical element.

9 Claims, 12 Drawing Sheets

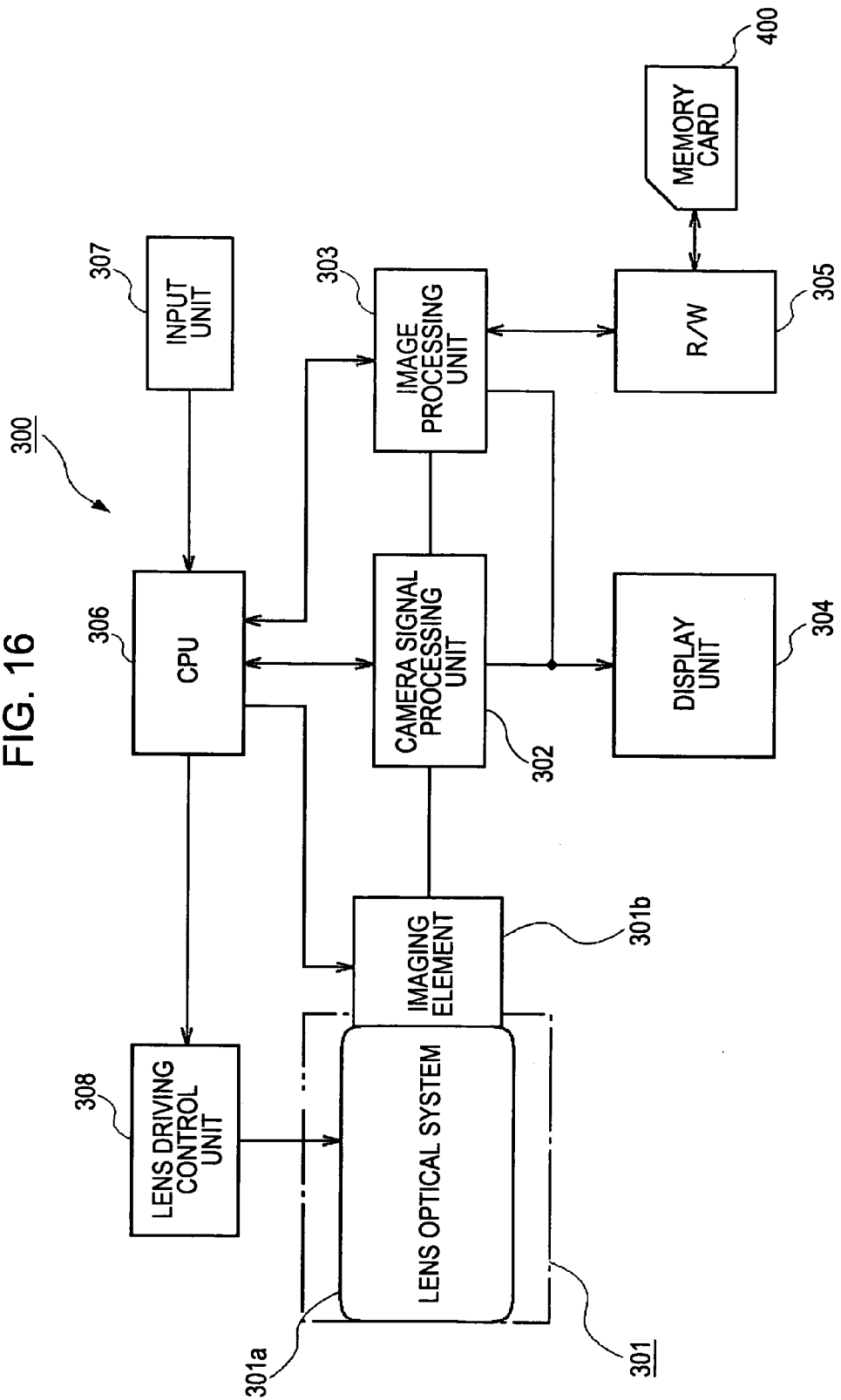

APPARATUS FOR MANUFACTURING OPTICAL ELEMENT, METHOD OF MANUFACTURING OPTICAL ELEMENT, OPTICAL ELEMENT, AND IMAGING DEVICE

CROSS-REFERENCE TO RELATED APPLICATION

The present application claims priority from Japanese Patent Application No. JP 2009-019661 filed in the Japanese Patent Office on Jan. 30, 2009, the entire content of which is incorporated herein by reference.

BACKGROUND OF THE INVENTION

1. Field of the Invention

The present invention relates to an apparatus for manufacturing an optical element, a method of manufacturing an optical element, an optical element, and an imaging device. Particularly, the present invention relates to a technical field for improving versatility and reducing manufacturing cost by transferring a shape of a transfer portion of a stamper having changeable curvature to a transferred surface formed in a curved surface of an optical element regardless of curvature of the transferred surface.

2. Description of the Related Art

There is known an apparatus for manufacturing an optical element, including a stamper used to transfer a shape of a microscopic structure or the like to a predetermined surface of an optical element such as a lens (for example, see Japanese Unexamined Patent Application Publication No. 2006-130841).

In the apparatus for manufacturing the optical element disclosed in Japanese Unexamined Patent Application Publication No. 2006-130841, a die (stamper) is provided with a transfer portion having a microscopic structure, and a shape of the transfer portion is transferred to a transferred surface of an optical element in the state where the transfer portion of the stamper is pressed down against the transferred surface of the optical element.

SUMMARY OF THE INVENTION

However, in the apparatus for manufacturing the optical element disclosed in Japanese Unexamined Patent Application Publication No. 2006-130841, since the stamper is the die, in the case where the transferred surface of the optical element is formed in a curved surface, the transfer portion of the stamper is formed to have the same curvature as that of the curved surface of the transferred surface.

Accordingly, the stamper is only used for one type of optical element having a transferred surface formed to have predetermined curvature, and the same stamper is not used for different types of optical elements respectively having transferred surfaces formed to have different curvatures. As a result, problems arise in that the stamper does not have versatility and manufacturing cost increases.

Therefore, it is desirable to provide an apparatus for manufacturing an optical element, a method of manufacturing an optical element, an optical element, and an imaging device capable of solving the above-described problems by improving versatility so that a transfer operation is able to be preformed regardless of curvature of a transferred surface and reducing manufacturing cost.

According to an embodiment of the invention, there is provided an apparatus for manufacturing an optical element, including: a flexible stamper having a transfer portion transferring a predetermined shape and having changeable curvature; a stamper holding mechanism holding the stamper; an element holding mechanism holding an optical element having a convex or concave curved surface, the curved surface serving as a transferred surface to which the shape of the transfer portion of the stamper is transferred; a curvature changing mechanism changing the curvature of the stamper in accordance with curvature of the transferred surface of the optical element; and a moving mechanism moving at least one of the stamper held by the stamper holding mechanism and the optical element held by the element holding mechanism in a direction in which the transfer portion of the stamper moves away from or closer to the transferred surface of the optical element.

Accordingly, in the apparatus for manufacturing the optical element, the shape of the transfer portion having changeable curvature in accordance with the curvature of the transferred surface of the optical element is transferred to the transferred surface.

In the apparatus for manufacturing the optical element having the above-described configuration, the transferred surface of the optical element may be formed in a concave shape, and the curvature of the transfer portion may be set to be larger than that of the transferred surface in the state before the transfer portion of the stamper comes into contact with the transferred surface of the optical element so as to transfer the shape of the transfer portion to the transferred surface.

Since the curvature of the transfer portion is set to be larger than that of the transferred surface in the state before transferring the shape of the transfer portion to the concave transferred surface, the transfer portion of the stamper is capable of coming into point contact with the transferred surface of the optical element.

In the apparatus for manufacturing the optical element having the above-described configuration, the transferred surface of the optical element may be formed in a convex shape, and the curvature of the transfer portion may be set to be smaller than that of the transferred surface in the state before the transfer portion of the stamper comes into contact with the transferred surface of the optical element so as to transfer the shape of the transfer portion to the transferred surface.

Since the curvature of the transfer portion is set to be smaller than that of the transferred surface in the state before transferring the shape of the transfer portion to the convex transferred surface, the transfer portion of the stamper is capable of coming into point contact with the transferred surface of the optical element.

In the apparatus for manufacturing the optical element having the above-described configuration, the transfer portion of the stamper may come into contact with the transferred surface of the optical element or may move close thereto, and a center of the transfer portion of the stamper may be positioned to a center of the transferred surface of the optical element.

Since the center of the transfer portion of the stamper is aligned to the center of the transferred surface of the optical element, the positional precision thereof is based on the center.

In the apparatus for manufacturing the optical element having the above-described configuration, in the state where the center of the transfer portion of the stamper is aligned to the center of the transferred surface of the optical element, the stamper and the optical element may move closer to each other, and the transfer portion of the stamper may be pressed down against the transferred surface of the optical element so as to gradually change the curvature of the transfer portion and to transfer the shape of the transfer portion to the transferred surface.

Since the shape of the transfer portion is transferred to the transferred surface by gradually changing the curvature of the transfer portion in the state where the center of the transfer portion is positioned to the center of the transferred surface, the shape of the transfer portion is transferred to the transferred surface in the positioned state.

In the apparatus for manufacturing the optical element having the above-described configuration, a hermetic space may be formed between the stamper and the stamper holding mechanism, and the curvature of the transfer portion of the stamper may be changed by changing a pressure in the hermetic space.

Since the curvature of the transfer portion of the stamper is changed by changing the pressure in the hermetic space, it is possible to apply uniform pressure to the entire region of the stamper.

According to another embodiment of the invention, there is provided a method of manufacturing an optical element, including the steps of: forming a flexible stamper having a transfer portion transferring a predetermined shape and having changeable curvature; disposing the stamper held by a stamper holding mechanism so that the transfer portion thereof faces a transferred surface formed as a convex and concave curved surface of an optical element held by an element holding mechanism; changing the curvature of the stamper in accordance with curvature of the transferred surface of the optical element by using a curvature changing mechanism; moving at least one of the stamper and the optical element in a direction in which the transfer portion and the transferred surface move closer to each other by using a moving mechanism; and transferring the shape of the transfer portion to the transferred surface by pressing down the transfer portion of the stamper against the transferred surface of the optical element.

Accordingly, in the method of manufacturing the optical element, the shape of the transfer portion having changeable curvature in accordance with the curvature of the transferred surface of the optical element is transferred to the transferred surface.

According to still another embodiment of the invention, there is provided an optical element including: a convex or concave curved surface serving as a transferred surface, wherein a shape of a transfer portion of a stamper is transferred to the transferred surface by using the flexible stamper having the transfer portion transferring a predetermined shape and changeable curvature.

Accordingly, in the optical element, the shape of the transfer portion having changeable curvature in accordance with the curvature of the transferred surface is transferred to the transferred surface.

According to still another embodiment of the invention, there is provided an imaging device including: an optical element having a convex or concave curved surface serving as a transferred surface, wherein a shape of a transfer portion of a stamper is transferred to the transferred surface by using the flexible stamper having the transfer portion transferring a predetermined shape and changeable curvature.

Accordingly, the imaging device includes the optical element in which the shape of the transfer portion having changeable curvature in accordance with the curvature of the transferred surface is transferred to the transferred surface.

According to the embodiment of the invention, there is provided an apparatus for manufacturing an optical element, including: a flexible stamper having a transfer portion transferring a predetermined shape and having changeable curvature; a stamper holding mechanism holding the stamper; an element holding mechanism holding an optical element having a convex or concave curved surface, the curved surface serving as a transferred surface to which the shape of the transfer portion of the stamper is transferred; a curvature changing mechanism changing the curvature of the stamper in accordance with curvature of the transferred surface of the optical element; and a moving mechanism moving at least one of the stamper held by the stamper holding mechanism and the optical element held by the element holding mechanism in a direction in which the transfer portion of the stamper moves away from or closer to the transferred surface of the optical element.

Accordingly, it is possible to use the stamper to manufacture plural types of optical elements of which the transferred surfaces respectively have different curvatures, and to improve the versatility of the stamper. Also, it is possible to shorten the manufacturing time of the optical element and to reduce the manufacturing cost.

In the apparatus for manufacturing the optical element having the above-described configuration, the transferred surface of the optical element is formed in a concave shape, and the curvature of the transfer portion is set to be larger than that of the transferred surface in the state before the transfer portion of the stamper comes into contact with the transferred surface of the optical element so as to transfer the shape of the transfer portion to the transferred surface.

Accordingly, it is possible to easily perform the positioning operation between the stamper and the optical element by using a predetermined point. Also, it is possible to simplify the positioning operation, and to improve the positioning precision.

In the apparatus for manufacturing the optical element having the above-described configuration, the transferred surface of the optical element is formed in a convex shape, and the curvature of the transfer portion is set to be smaller than that of the transferred surface in the state before the transfer portion of the stamper comes into contact with the transferred surface of the optical element so as to transfer the shape of the transfer portion to the transferred surface.

Accordingly, it is possible to easily perform the positioning operation between the stamper and the optical element by using a predetermined point. Also, it is possible to simplify the positioning operation, and to improve the positioning precision.

In the apparatus for manufacturing the optical element having the above-described configuration, the transfer portion of the stamper comes into contact with the transferred surface of the optical element or may move close thereto, and a center of the transfer portion of the stamper is aligned to a center of the transferred surface of the optical element.

Accordingly, it is possible to improve the positional precision between the stamper and the optical element.

In the apparatus for manufacturing the optical element having the above-described configuration, in the state where the center of the transfer portion of the stamper is aligned to the center of the transferred surface of the optical element, the stamper and the optical element move closer to each other, and the transfer portion of the stamper is pressed down against the transferred surface of the optical element so as to gradually change the curvature of the transfer portion and to transfer the shape of the transfer portion to the transferred surface.

Accordingly, since the shape of the transfer portion is transferred to the transferred surface while the positioning operation therebetween is performed with high precision, it is possible to improve the precision of molding the optical element.

In the apparatus for manufacturing the optical element having the above-described configuration, a hermetic space is formed between the stamper and the stamper holding mechanism, and the curvature of the transfer portion of the stamper is changed by changing a pressure in the hermetic space.

Accordingly, it is possible to easily change the curvature of the stamper, and to improve the efficiency during the manufacturing operation.

According to the another embodiment of the invention, there is provided a method of manufacturing an optical element, including the steps of: forming a flexible stamper having a transfer portion transferring a predetermined shape and having changeable curvature; disposing the stamper held by a stamper holding mechanism so that the transfer portion thereof faces a transferred surface formed as a convex and concave curved surface of an optical element held by an element holding mechanism; changing the curvature of the stamper in accordance with curvature of the transferred surface of the optical element by using a curvature changing mechanism; moving at least one of the stamper and the optical element in a direction in which the transfer portion and the transferred surface move closer to each other by using a moving mechanism; and transferring the shape of the transfer portion to the transferred surface by pressing down the transfer portion of the stamper against the transferred surface of the optical element.

Accordingly, it is possible to use the stamper to manufacture plural types of optical elements of which the transferred surfaces respectively have different curvatures, and to improve the versatility of the stamper. Also, it is possible to shorten the manufacturing time of the optical element and to reduce the manufacturing cost.

According to the still another embodiment of the invention, there is provided an optical element including: a convex or concave curved surface serving as a transferred surface, wherein a shape of a transfer portion of a stamper is transferred to the transferred surface by using the flexible stamper having the transfer portion transferring a predetermined shape and changeable curvature.

Accordingly, it is possible to use the stamper to manufacture plural types of optical elements of which the transferred surfaces respectively have different curvatures, and to improve the versatility of the stamper. Also, it is possible to shorten the manufacturing time of the optical element and to reduce the manufacturing cost.

According to the still another embodiment of the invention, there is provided an imaging device including: an optical element having a convex or concave curved surface serving as a transferred surface, wherein a shape of a transfer portion of a stamper is transferred to the transferred surface by using the flexible stamper having the transfer portion transferring a predetermined shape and changeable curvature.

Accordingly, it is possible to use the stamper to manufacture plural types of optical elements of which the transferred surfaces respectively have different curvatures, and to improve the versatility of the stamper. Also, it is possible to shorten the manufacturing time of the optical element provided in the imaging device and to reduce the manufacturing cost.

BRIEF DESCRIPTION OF THE DRAWINGS

FIG. 16 illustrates an imaging device.

DESCRIPTION OF THE PREFERRED EMBODIMENTS

Hereinafter, an apparatus for manufacturing an optical element, a method of manufacturing an optical element, an optical element, and an imaging device according to embodiments of the invention will be described with reference to the accompanying drawings.

Configuration of Apparatus for Manufacturing Optical Element

Figure 1:
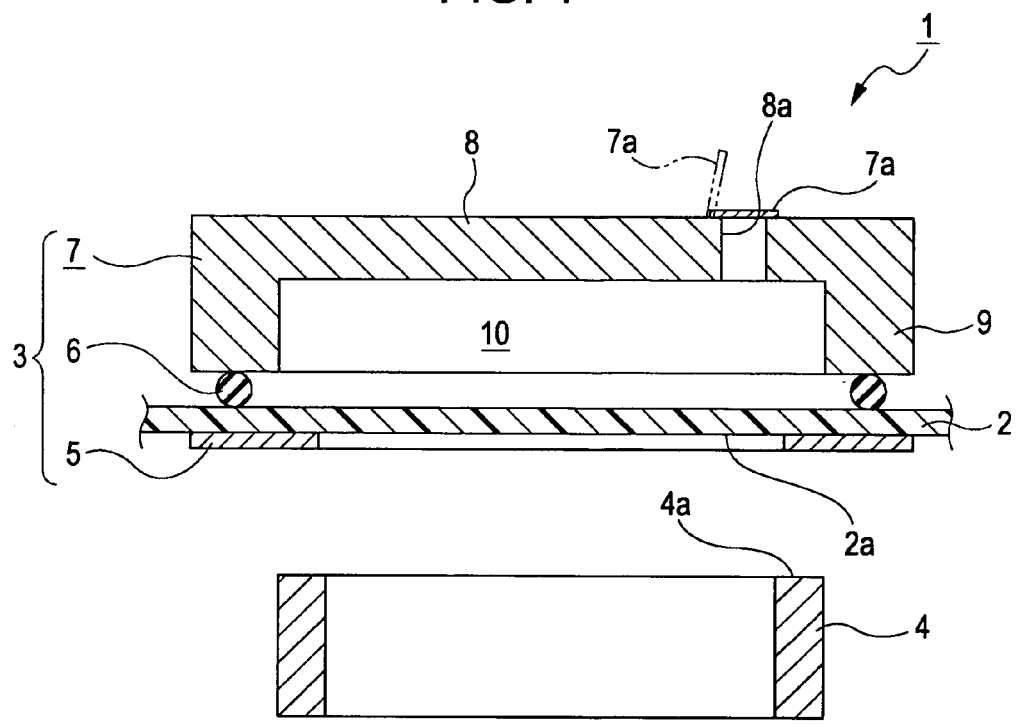
FIG. 1 shows the preferred embodiments of the invention together with FIGS. 2 to 16, and is a schematic sectional view showing an apparatus for manufacturing an optical element.

An apparatus 1 for manufacturing an optical element includes a stamper 2, a stamper holding mechanism 3, and an element holding mechanism 4 (see FIG. 1).

The stamper 2 is formed by, for example, a thermoplastic polymer film. In detail, the stamper 2 is formed of, for example, polycarbonate, olefin-based resin, polymethylmethacrylate (PMMA), or the like. Accordingly, the stamper 2 has flexibility, and curvature is changeable in a curved state.

Figure 2:
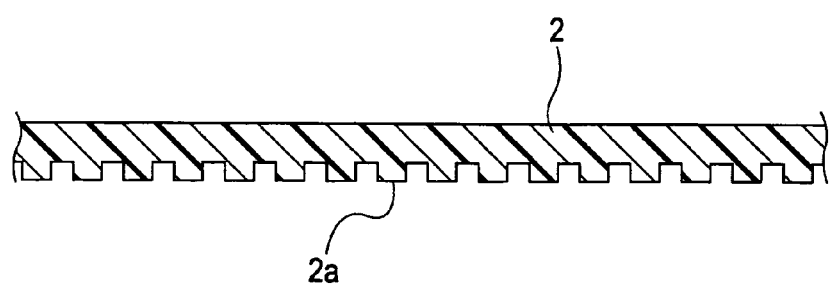
FIG. 2 is a schematic enlarged sectional view of a stamper.

One surface of the stamper 2 is provided with a transfer portion 2a formed as a microscopic structure (see FIG. 2).

The stamper holding mechanism 3 includes a pressing ring 5, an O-ring 6, and a pressing member 7 (see FIG. 1).

The pressing ring 5 is formed in, for example, an annular shape having a thin thickness.

The O-ring 6 is located above, for example, the pressing ring 5, and holds the stamper 2 between the pressing ring 5 and the pressing ring 6.

The pressing member 7 includes a disk-shaped base portion 8 and a pressing portion 9 protruding downward from the outer peripheral portion of the base portion 8, and the base portion 8 includes a pressure adjusting hole 8a. The pressing member 7 is provided with a valve 7a, and the pressure adjusting hole 8a is opened or closed by the valve 7a. The pressing member 7 holds the stamper 2 in such a manner that the pressing portion 9 presses the stamper 2 against the pressing ring 5 through the O-ring 6.

In the state where the O-ring 6 is pressed downward by the pressing member 7, a hermetic space 10 is formed between the stamper 2 and the pressing member 7. A pressure (internal pressure) of the hermetic space 10 changes when a fluid such as air or liquid enters or exits through the pressure adjusting hole 8a.

When the pressure in the hermetic space 10 becomes larger than an atmospheric pressure up to a positive pressure, an inner portion 2b of the stamper 2 inside the pressing member 7 is curved so as to have a downward convex shape. On the contrary, when the pressure in the hermetic space 10 becomes lower than the atmospheric pressure up to a negative pressure, the inner portion 2b of the stamper 2 inside the pressing member 7 is curved so as to have an upward convex shape. The curvature of the curved stamper 2 changes in accordance with the pressure in the hermetic space 10. Accordingly, a fluid such as air for adjusting the pressure in the hermetic space 10 is used to change the curvature of the stamper 2.

The element holding mechanism 4 is disposed below the stamper holding mechanism 3, and is formed in, for example, a cylindrical shape. The upper surface of the element holding mechanism 4 is formed as an element placement surface 4a on which an optical element 100 is placed.

Configuration of Optical Element

Figure 3:
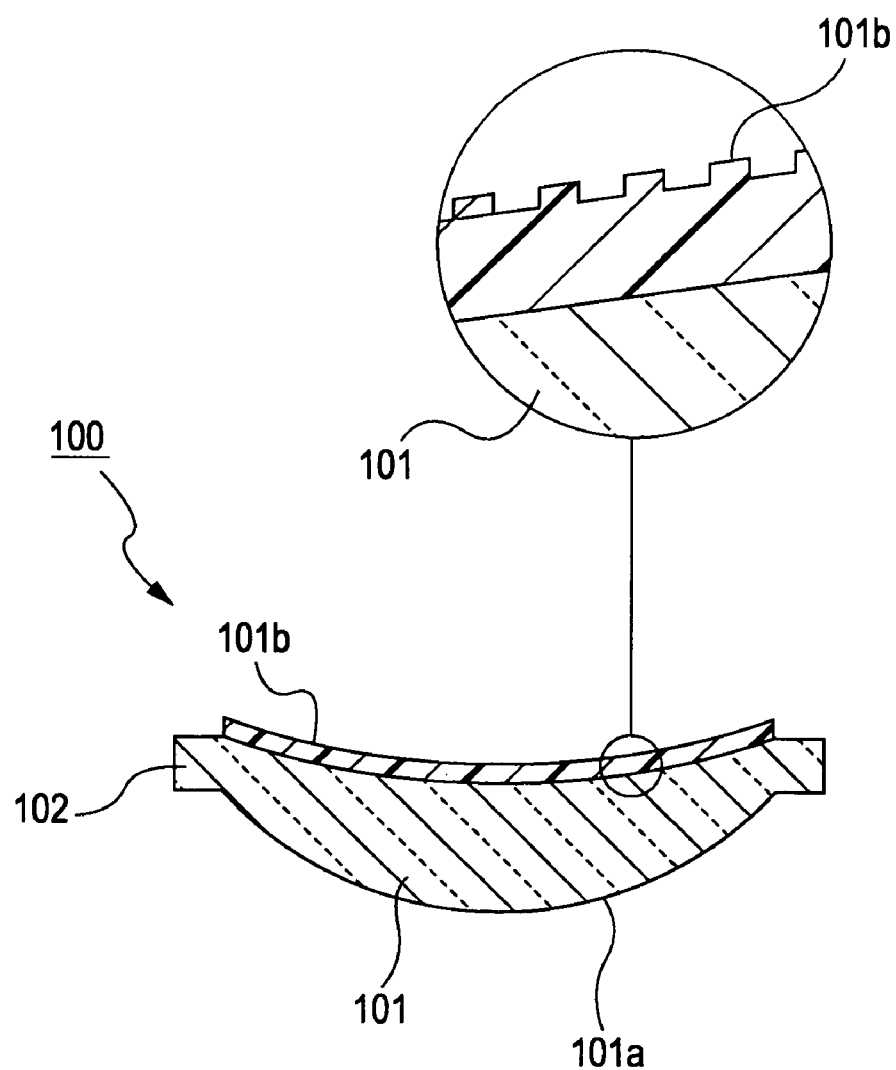
FIG. 3 is an enlarged sectional view of the optical element.

The optical element 100 is, for example, a lens, and includes a lens portion 101 and an edge portion 102 continuous to the outer periphery of the lens portion 101 (see FIG. 3). In the optical element 100, for example, one surface of the lens portion 101 is formed as a convex surface 101a, and the other surface of the lens portion 101 is formed as a concave surface which is a transferred surface 101b. The transferred surface 101b of the lens portion 101 has a predetermined microscopic structure.

Method of Manufacturing Optical Element

Hereinafter, a method of manufacturing the optical element 100 by using the apparatus 1 for manufacturing the optical element will be described (see FIGS. 4 to 10).

Figure 4:
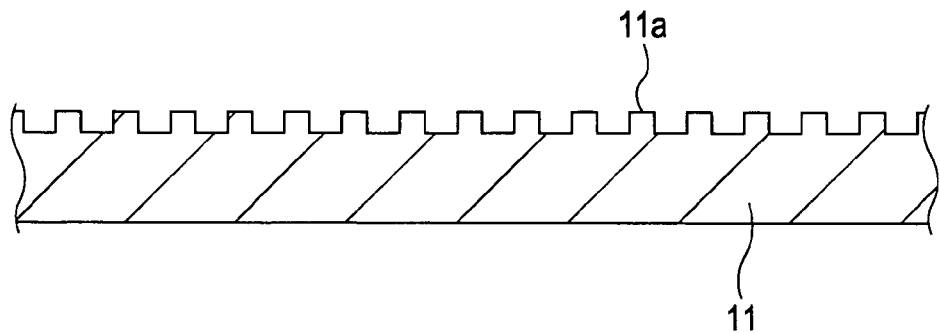
FIG. 4 shows a method of manufacturing an optical element by using the apparatus for manufacturing the optical element, together with FIGS. 5 to 10, and is a schematic enlarged sectional view showing a disk.

First, a disk 11 for forming the stamper 2 is formed (see FIG. 4). The disk 11 has a structure surface 11a having the same structure as that of the transferred surface 101b of the optical element 100 which is a final product to be formed.

The disk 11 is formed by, for example, various methods such as electroforming for forming a molding product by depositing a metallic layer on a processing object through electroplating, direct processing for directly processing a processing object through cutting, reactive ion etching (RIE) classified as dry etching, and laser processing for forming a predetermined shape in a processing object in such a manner that the processing object is irradiated with a laser beam.

The disk 11 is formed of, for example, metal, quartz, silicon, and other non-plastic materials. The curvature of the structure surface 11a of the disk may not be equal to the curvature of the transferred surface 101b of the molding product (optical element 100). For example, the structure surface 11a may be formed as a plane, and the curvature thereof may be substantially equal to the curvature of the transferred surface 101b.

Figure 5:
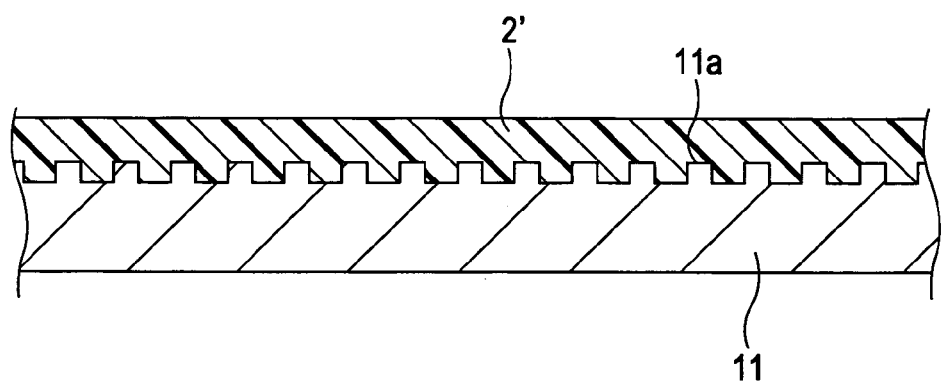
FIG. 5 is a schematic enlarged sectional view showing a state where the stamper is formed.

Subsequently, the stamper 2 is formed by using the disk 11 (see FIG. 5).

The stamper 2 is formed in such a manner that the structure surface 11a of the disk 11 is pressed against a surface of a film material 2' such as a thermoplastic polymer film which is a material used to form the stamper 2, and a surface layer of the film material 2' is heated up to a temperature exceeding a glass-transition temperature of the film material 2'.

When the surface layer of the film material 2' arrives at the glass-transition temperature, the surface layer of the film material 2' is compressed by a pressure applied to the disk 11 so that the shape of the structure surface 11a is transferred thereto. The compressing operation may be performed by using a compressing method using a liquid or gas, or may be performed by a mechanical compressing method.

Figure 6:
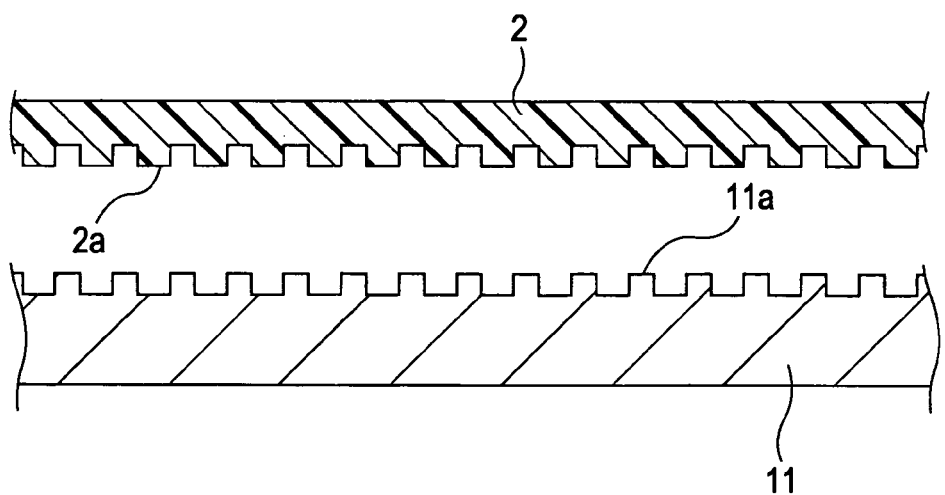
FIG. 6 is a schematic enlarged sectional view showing a state where the stamper is formed.

When the disk 11 is moved away from the film material 2', the stamper 2 having flexibility is formed (see FIG. 6).

In addition, in the above description, an example is described in which the thermoplastic polymer film is used as the film material 2', but for example, a photo-curable polymer film may be used as the film material 2'. In the case where the photo-curable polymer film is used as the film material 2', the stamper 2 may be formed in such a manner that the structure surface 11a of the disk 11 comes into contact with the surface layer of the film material 2' and the shape of the structure surface 11a is transferred thereto through exposure. In this case, it is not necessary to perform a heating operation up to a temperature exceeding the glass-transition temperature.

Figure 7:
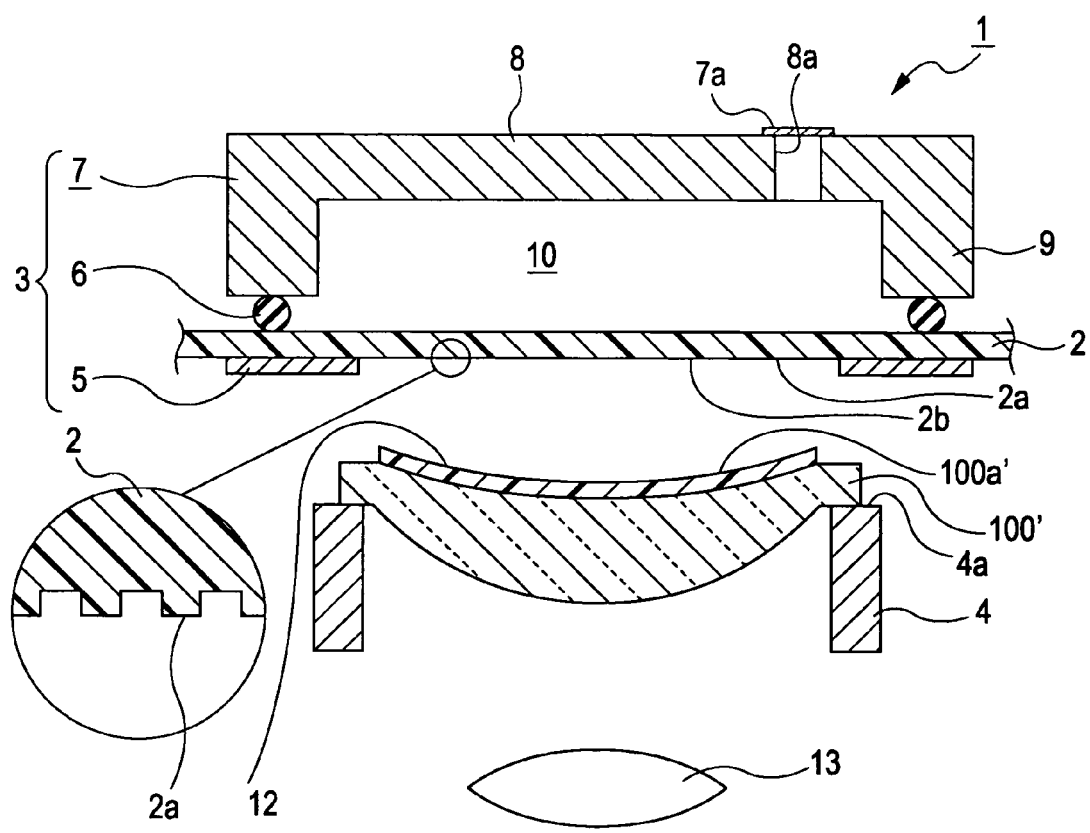
FIG. 7 is a schematic sectional view showing a state where the optical element is held by an element holding mechanism.

Subsequently, the stamper 2 is held by the stamper holding mechanism 3 in a direction in which the transfer portion 2a faces downward (see FIG. 7). As described above, the stamper 2 is held by the stamper holding mechanism 3 in such a manner that the pressing member 7 presses down the O-ring 6 against the stamper 2 by sandwiching the stamper 2 between O-ring 6 and the pressing ring 5 in the vertical direction.

In the state where the stamper 2 is held by the stamper holding mechanism 3, a base material 100' used for forming the optical element 100 is placed and held on the element placement surface 4a of the element holding mechanism 4. The base material 100' held by the element holding mechanism 4 is located below the transfer portion 2a of the stamper 2. A reference mark is attached to the center of the transfer portion 2a of the portion 2b of the stamper 2 in advance.

The base material 100' is held by the element holding mechanism 4 so that a concave surface (transferred surface) 100a' faces the stamper 2, and a UV curable resin is applied to the concave surface 100a' through spin coating or the like. A reference mark is attached to the deepest portion of the concave surface 100a', that is, the center of the concave surface 100a' in advance.

A predetermined optical system, for example, a convex lens 13 is disposed below the base material 100'.

Figure 8:
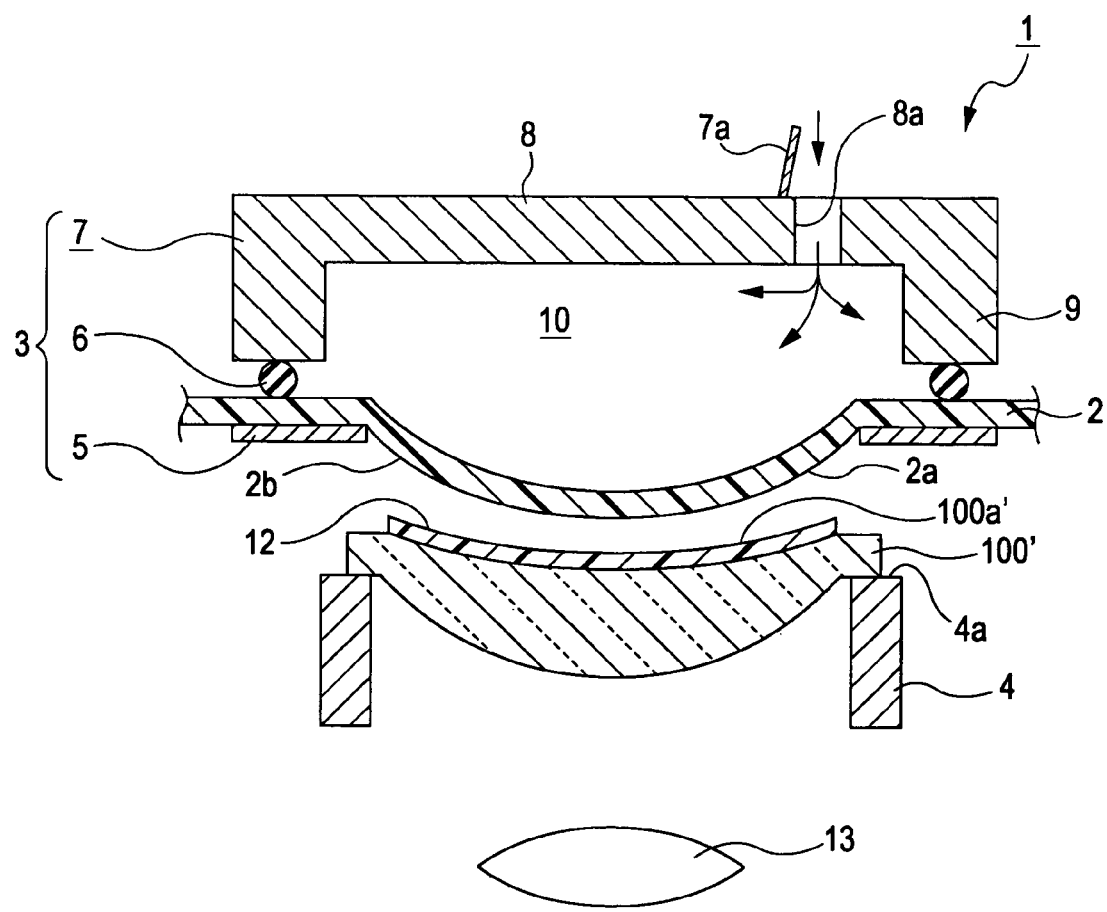
FIG. 8 is a schematic sectional view showing a state where the stamper is curved.

Subsequently, the pressure adjusting hole 8a is opened by opening the valve 7a, and air or the like is sent to the hermetic space 10 through the pressure adjusting hole 8a so as to have a positive pressure state (see FIG. 8). When the hermetic space 10 is in a positive pressure state, the portion 2b of the stamper 2 not pressed by the pressing ring 5 is curved in a downward convex shape. At this time, the pressure in the hermetic space 10 is adjusted so that the curvature of the downward convex portion 2b is larger than that of the concave surface 100a' of the base material 100'. When the pressure in the hermetic space 10 is adjusted, the pressure adjusting hole 8a is closed by closing the valve 7a.

Figure 9:
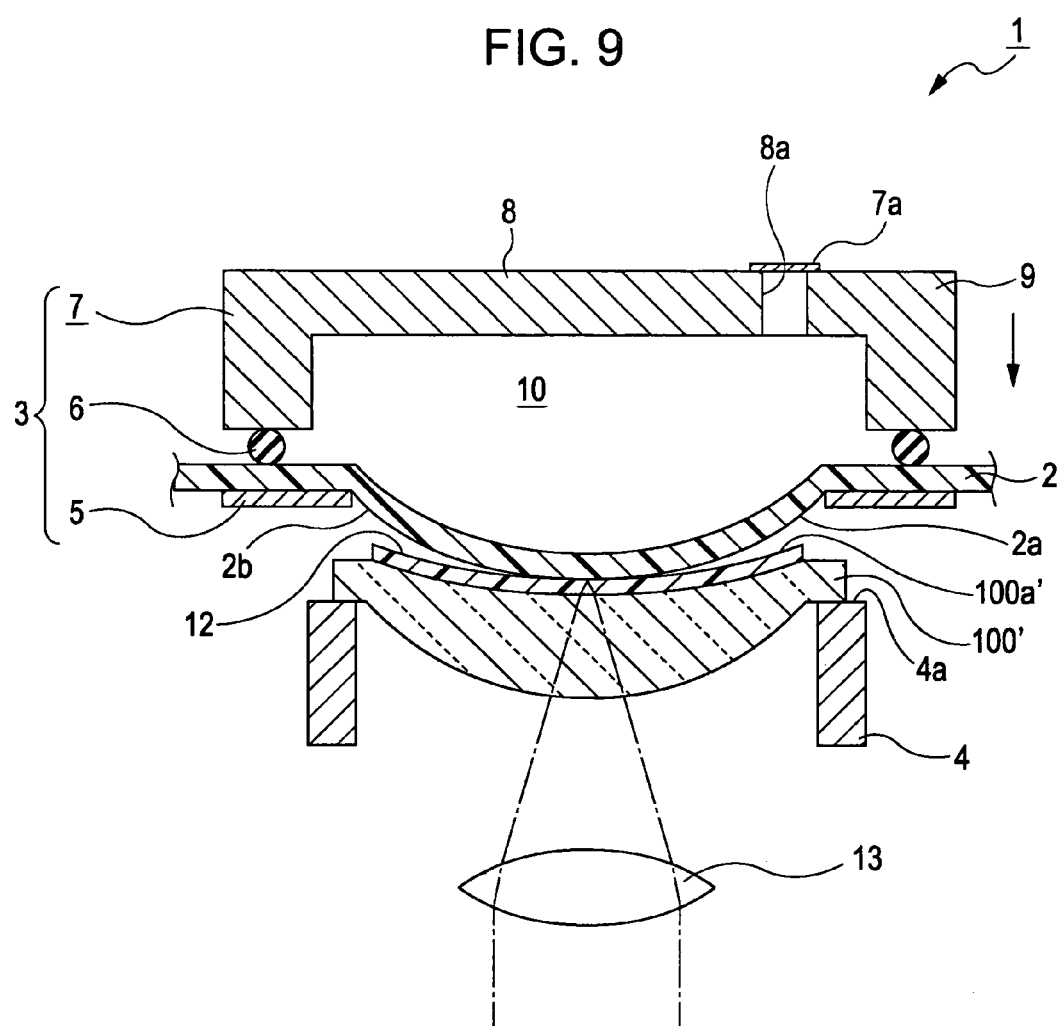
FIG. 9 is a schematic sectional view showing a state where the stamper and the optical element are positioned.

Subsequently, the stamper holding mechanism 3 holding the stamper 2 is moved downward by a moving mechanism (not shown) (see FIG. 9). In addition, the movement using the moving mechanism is not limited to the example in which the stamper holding mechanism 3 is moved downward. For example, the element holding mechanism 4 holding the base material 100' may be moved upward. Alternatively, the stamper holding mechanism 3 may be moved downward, and the element holding mechanism 4 may be moved upward.

The downward movement of the stamper holding mechanism 3 holding the stamper 2 stops at a position where the deepest portion of the concave surface 100a' of the base material 100' moves closer to the center of the portion 2b of the stamper 2. At this time, the positions of the stamper 2 and the base material 100' in the plane direction are adjusted so that the reference mark attached to the transfer portion 2a of the stamper 2 and the reference mark attached to the concave surface 100a' of the base material 100' are aligned to the focal point of the convex lens 13.

In addition, in the above description, an example is described in which the positions of the stamper 2 and the base material 100' are adjusted while being adjacent to each other. However, for example, the positions of the stamper 2 and the base material 100' (the surface of the UV curable resin 12) may be adjusted while being brought into contact with each other.

As described above, since the position of the center of the concave surface 100a' of the base material 100' is adjusted, as described above, it is possible to ensure high positional precision when the shape of the transfer portion 2a of the stamper 2 is transferred to the base material 100'.

Figure 10:
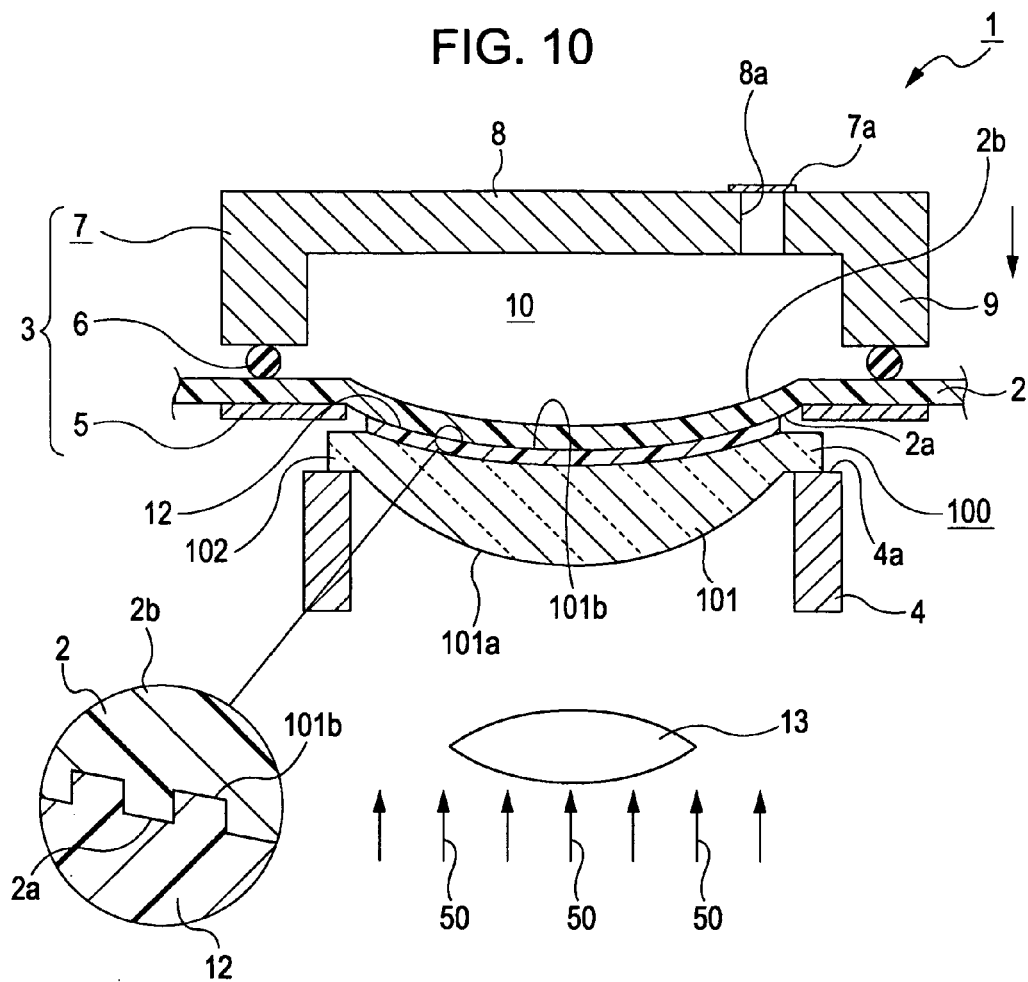
FIG. 10 is a schematic sectional view showing a state where a shape of a transfer portion of the stamper is transferred and the optical element is formed.

Subsequently, the stamper holding mechanism 3 for holding the stamper 2 is moved down again by the moving mechanism (see FIG. 10). When the stamper holding mechanism is moved downward, the reference mark of the stamper 2 matches with the reference mark of the base material 100', and the portion 2b is gradually deformed so that the curvature of the transfer portion 2a of the stamper 2 is equal to the curvature of the concave surface 100a' of the base material 100'. Accordingly, the transfer portion 2a is pressed down against the UV curable resin 12 on the basis of the reference which is the center of the portion 2b, so that the shape of the transfer portion 2a is transferred to the UV curable resin 12.

Subsequently, in the state where the transfer portion 2a is pressed down against the UV curable resin 12, UV light 50 illuminates the UV curable resin 12 so as to cure the UV curable resin 12.

Finally, when the stamper holding mechanism 3 holding the stamper 2 is moved upward, the stamper 2 is moved away from the UV curable resin 12, thereby obtaining the optical element 100 to which the shape of the transfer portion 2a is transferred.

In addition, in the above description, an example is described in which the hermetic space 10 is formed between the stamper 2 and the stamper holding mechanism 3, and the pressure in the hermetic space 10 is adjusted by a fluid so as to curve the stamper 2. However, for example, the stamper 2 may be pressed and curved by a mechanical pressing mechanism (not shown) so that the reference marks thereof are positioned to each other.

Method of Manufacturing Another Optical Element

Hereinafter, a method of manufacturing an optical element 200 by using the apparatus 1 for manufacturing the optical element will be described.

Figure 11:
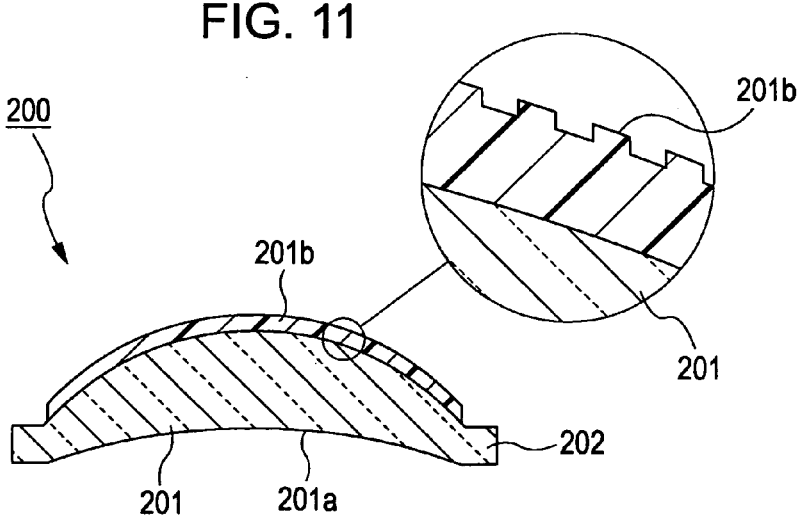
FIG. 11 is an enlarged sectional view showing another optical element.

As shown in FIG. 11, the optical element 200 includes a lens portion 201 and an edge portion 202 continuous to the outer periphery of the lens portion 201. In the optical element 200, one surface of the lens portion 201 is formed as a concave surface 201a, and the other surface of the lens portion 201 is formed as a convex surface which is a transferred surface 201b.

In addition, since the method of manufacturing the optical element 200 has the same steps as those of the method of manufacturing the optical element 100, in the following description, the same steps as those of the method of manufacturing the optical element 100 will be simply described or the description thereof will be omitted.

Even in the method of manufacturing the optical element 200, the disk 11 and the stamper 2 are formed as in the method of manufacturing the optical element 100.

Figure 12:
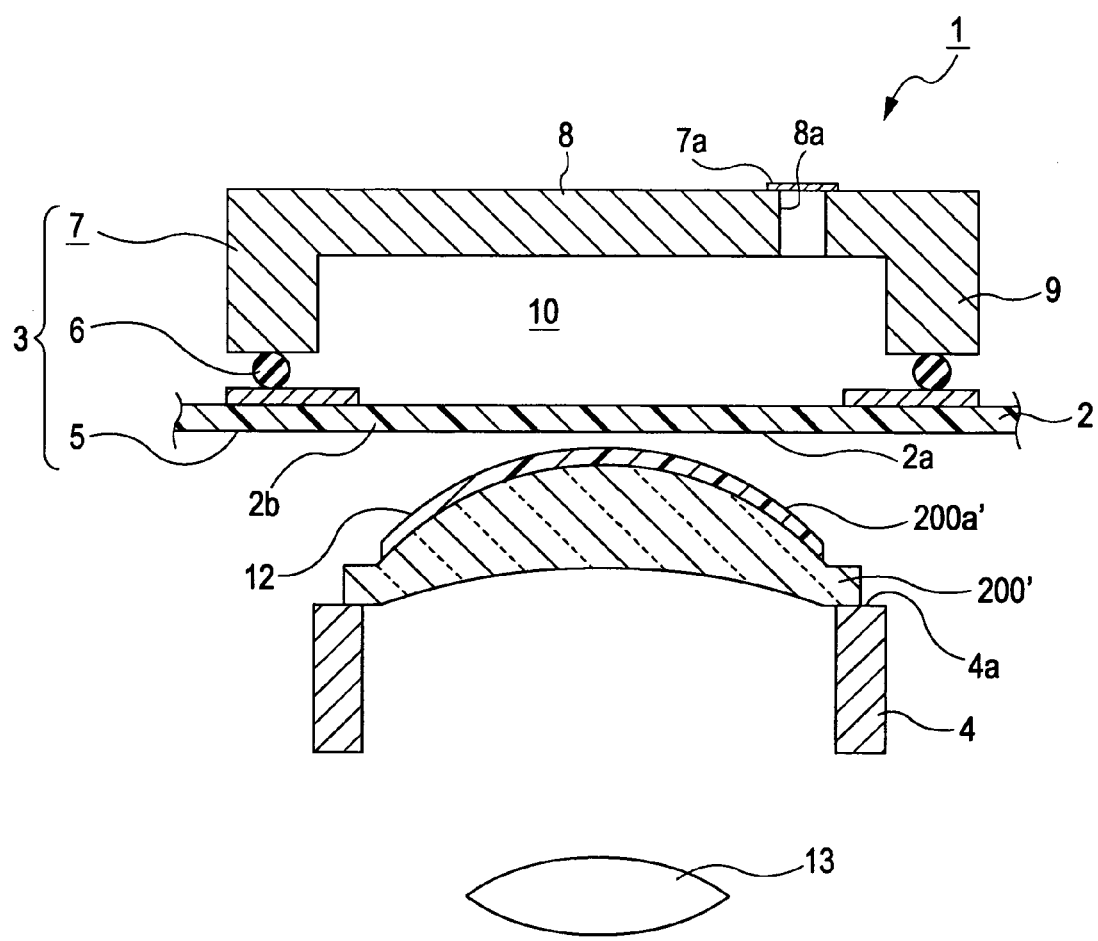
FIG. 12 shows a method of manufacturing another optical element by using the apparatus for manufacturing the optical element together with FIGS. 13 to 15, and is a schematic sectional view showing a state where the optical element is held by the element holding mechanism.

Subsequently, the stamper 2 is held by the stamper holding mechanism 3 in a direction in which the transfer portion 2a faces downward (see FIG. 12). The stamper 2 is held by the stamper holding mechanism 3 as in the method of manufacturing the optical element 100.

In the state where the stamper 2 is held by the stamper holding mechanism 3, a base material 200' used for forming the optical element 200 is placed and held on the element placement surface 4a of the element holding mechanism 4.

The base material 200' is held by the element holding mechanism 4 so that a convex surface (transferred surface) 200a' faces the stamper 2, and the UV curable resin is applied to the convex surface 200a' through spin coating or the like. A reference mark is attached to the top portion of the convex surface 200a', that is, the center of the convex surface 200a' in advance.

Figure 13:
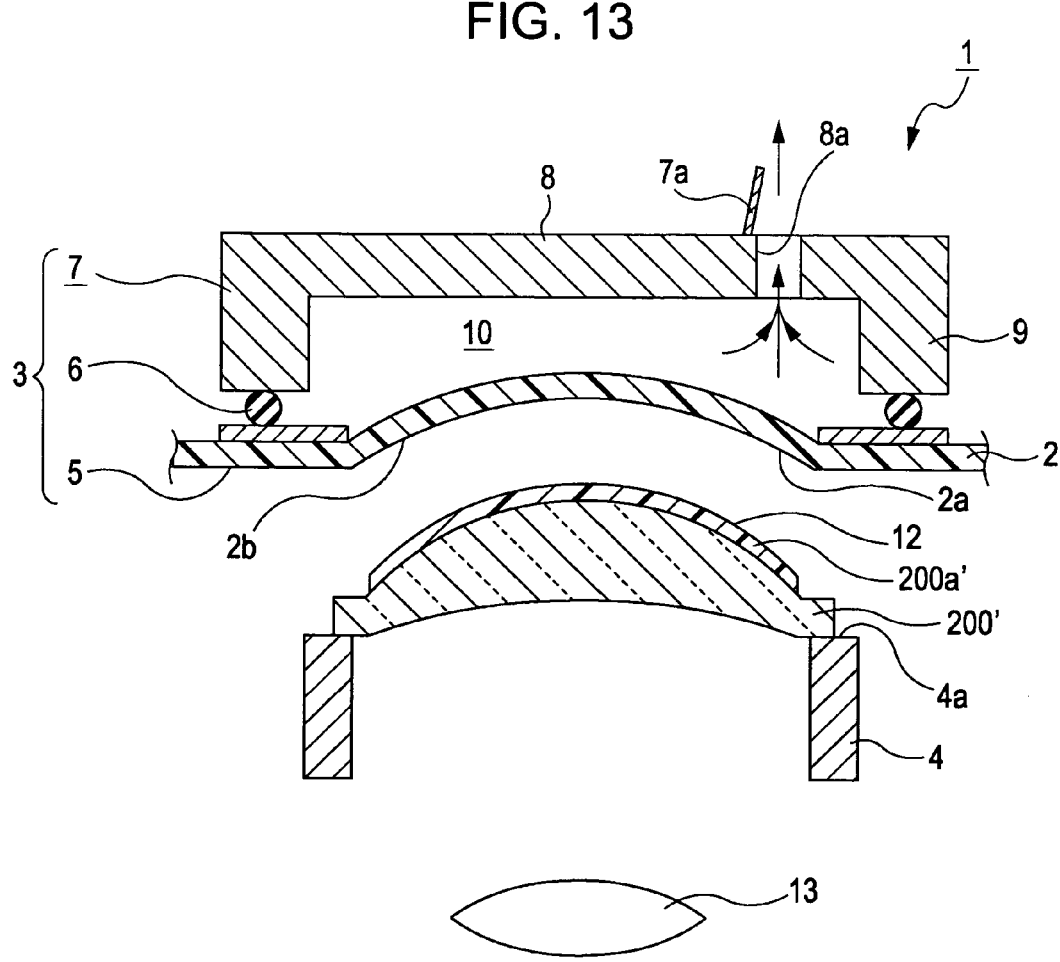
FIG. 13 is a schematic sectional view showing a state where the stamper is curved.

Subsequently, the pressure adjusting hole 8a is opened by opening the valve 7a, and air or the like is discharged from the hermetic space 10 through the pressure adjusting hole 8a so as to allow the hermetic space 10 to be in a negative pressure state (see FIG. 13). When the hermetic space 10 is in a negative pressure state, the portion 2b of the stamper 2 not pressed by the pressing ring 5 is curved in a downward concave shape. At this time, the pressure in the hermetic space 10 is adjusted so that the curvature of the downward concave portion 2b is smaller than that of the convex surface 200a' of the base material 200'. When the pressure in the hermetic space 10 is adjusted, the pressure adjusting hole 8a is closed by closing the valve 7a.

Figure 14:
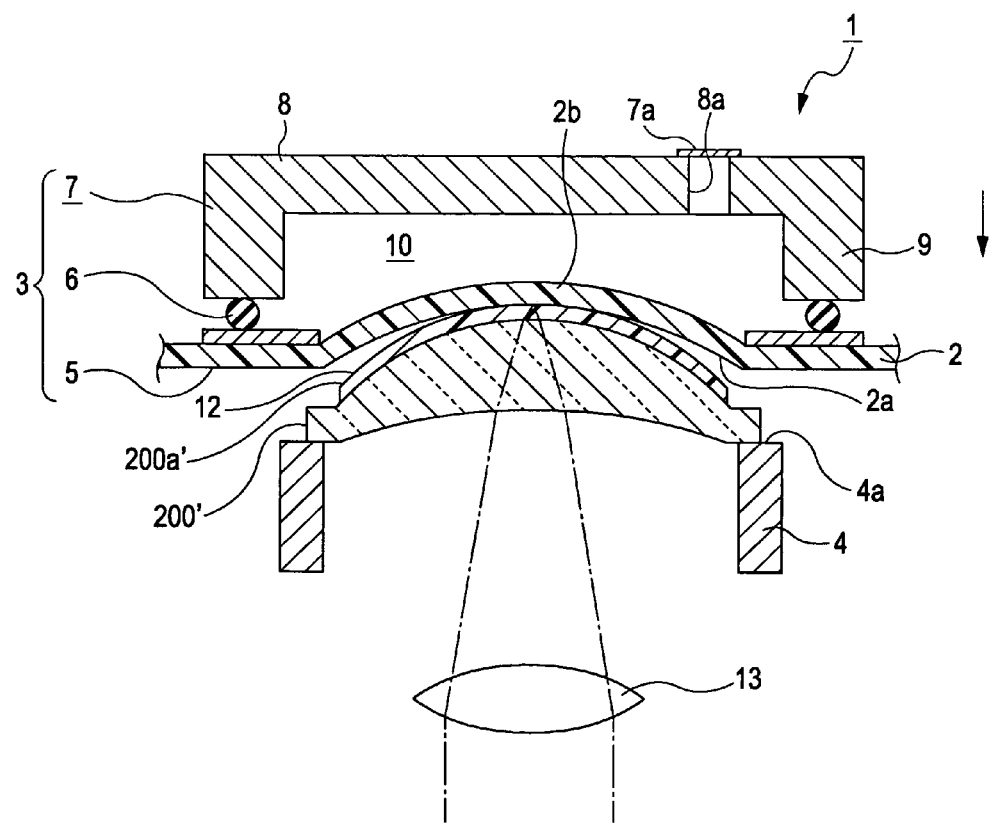
FIG. 14 is a schematic sectional view showing a state where the stamper and the optical element are positioned.

Subsequently, the stamper holding mechanism 3 holding the stamper 2 is moved downward by the moving mechanism (see FIG. 14).

The downward movement of the stamper holding mechanism 3 holding the stamper 2 stops at a position where the top portion of the convex surface 200a' of the base material 200' moves closer to the center of the portion 2b of the stamper 2. At this time, the positions of the stamper 2 and the base material 200' in the plane direction are adjusted so that the reference mark attached to the transfer portion 2a of the stamper 2 and the reference mark attached to the convex surface 200a' of the base material 200' are aligned to the focal point of the convex lens 13.

Figure 15:
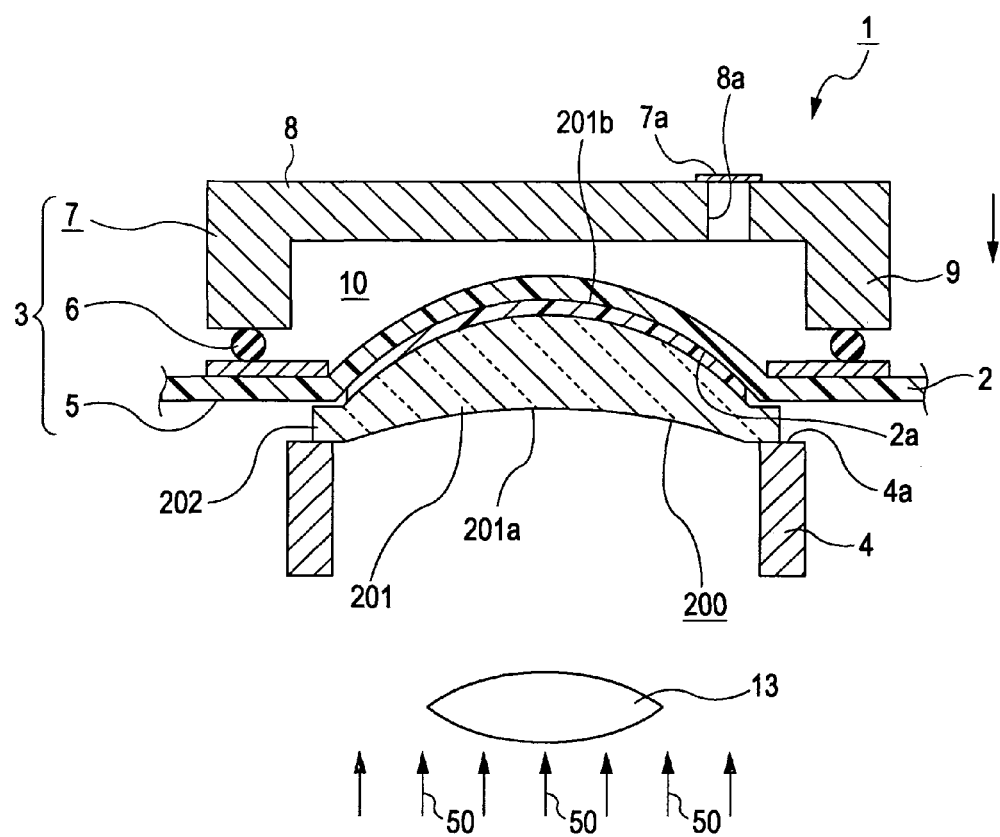
FIG. 15 is a schematic sectional view showing a state where the shape of the transfer portion of the stamper is transferred and the optical element is formed.

Subsequently, the stamper holding mechanism 3 for holding the stamper 2 is moved down again by the moving mechanism (see FIG. 15). When the stamper holding mechanism is moved downward, the reference mark of the stamper 2 matches with the reference mark of the base material 200', and the portion 2b is gradually deformed so that the curvature of the transfer portion 2a of the stamper 2 is equal to the curvature of the convex surface 200a' of the base material 200'. Accordingly, the transfer portion 2a is pressed down against the UV curable resin 12 on the basis of the reference which is the center of the portion 2b, so that the shape of the transfer portion 2a is transferred to the UV curable resin 12.

Subsequently, in the state where the transfer portion 2a is pressed down against the UV curable resin 12, UV light 50 illuminates the UV curable resin 12 so as to cure the UV curable resin 12.

Finally, when the stamper holding mechanism 3 holding the stamper 2 is moved upward, the stamper 2 is moved away from the UV curable resin 12, thereby obtaining the optical element 200 to which the shape of the transfer portion 2a is transferred.

Configuration of Imaging Device

Hereinafter, an imaging device 300 adopting the optical element 100 or the optical element 200 will be described (see FIG. 16).

The imaging device 300 is, for example, a digital camera, a digital video camera, a cellular phone equipped with a camera, and a camera of a digital input-output device such as a PDA (Personal Digital Assistant) equipped with a camera.

The imaging device 300 includes a camera block 301 which is in charge of an imaging function, a camera signal processing unit 302 which performs a signal process such as an A/D conversion of a photographed image signal, and an image processing unit 303 which performs a recording/reproducing process of an image signal. In addition, the imaging device 300 further includes a display unit 304 such as a liquid crystal panel for displaying a photographed image or the like thereon, a R/W (read/writer) 305 which writes or reads an image signal to or from a memory card 400, and a CPU (Central Processing Unit) 306 which generally controls the imaging device. In addition, the imaging device 300 further includes an input unit 307 which has various switches and the like operated by an user to perform a necessary operation, and a lens driving control unit 308 which controls a driving operation of a movable lens disposed in the camera block 301.

The camera block 301 includes a lens optical system 301a which has various lenses such as optical elements 100 and 200 or an imaging element 301b such as a CCD (Charge Coupled Device) or a CMOS (Complementary Metal Oxide Semiconductor).

The camera signal processing unit 302 performs various signal processes such as a digital conversion, a noise removal, an image quality correction, and a luminance/color difference signal conversion on the signal output from the imaging element 301b.

The image processing unit 303 performs a compression coding/expansion decoding process of an image signal based on a predetermined image data format or a conversion process of a data specification such as a resolution.

The display unit 304 has a function of displaying various data such as a photographed image or a user's operation state of the input unit 307.

The R/W 305 writes coded image data to the memory card 400 or reads image data recorded in the memory card 400 by using the image processing unit 303.

The CPU 306 serves as a control processing unit for controlling respective circuit blocks provided in the imaging device 300, and controls the respective circuit blocks on the basis of command input signals or the like input from the input unit 307.

The input unit 307 includes, for example, a shutter release button for performing a shutter operation, a selection switch for selecting an operation mode, and the like, and outputs the command input signal in accordance with a user's operation to the CPU 306.

The lens driving control unit 308 controls a motor (not shown) for driving a movable lens such as a zoom lens on the basis of the control signal from the CPU 306.

The memory card 400 is, for example, a semiconductor memory which is detachable from a slot connected to the R/W 305.

Operation of Imaging Device

Hereinafter, an operation of the imaging device 300 will be described.

In a photographing standby state, under the control of the CPU 306, an image signal photographed by the camera block 301 is output to the display unit 304 through the camera signal processing unit 302, and is displayed as a camera through image. In addition, when a command input signal for a zooming operation is input from the input unit 307, the CPU 306 outputs a control signal to the lens driving control unit 308, and the movable lens is moved on the basis of the control of the lens driving control unit 308.

When a shutter (not shown) of the camera block 301 is operated by a command input signal from the input unit 307, the photographed image signal is output from the camera signal processing unit 302 to the image processing unit 303 so as to be subjected to a compression coding process, thereby obtaining a predetermined data format of digital data. The converted data is output to the R/W 305, and is written to the memory card 400.

The focusing operation is performed, for example, in such a manner that the movable lens is moved by the lens driving control unit 308 on the basis of the control signal from the CPU 306 when the shutter release button of the input unit 307 is half pressed or is fully pressed for the recording (photographing) operation.

In the case where the image data stored in the memory card 400 is reproduced, in accordance with the operation of the input unit 307, predetermined image data is read from the memory card 400 by using the R/W 305, the expansion decoding process is performed by the image processing unit 303, and then the reproduction image signal is output to the display unit 304 so as to display the reproduction image thereon.

As described above, in the apparatus 1 for manufacturing the optical element, the stamper 2 having the curvature changing in accordance with the curvature of the transferred surface 101b or 201b of the optical element 100 or 200 is pressed against the transferred surface 101b or 201b of the optical element 100 or 200, thereby transferring the shape of the transfer portion 2a thereto.

Accordingly, it is possible to use the stamper 2 to manufacture plural types of optical elements of which the transferred surfaces 101b and 201b respectively have different curvatures, and to improve the versatility of the stamper 2. Also, it is possible to shorten the manufacturing time of the optical element and to reduce the manufacturing cost.

In addition, in the apparatus 1 for manufacturing the optical element, regarding the optical element 100 having the concave transferred surface 101b, the curvature of the transfer portion 2a of the stamper 2 is set to be larger than that of the transferred surface 101b before the transfer operation is performed. Regarding the optical element 200 having the convex transferred surface 201b, the curvature of the transfer portion 2a of the stamper 2 is set to be smaller than that of the transferred surface 201b before the transfer operation is performed.

Accordingly, it is possible to easily perform the positioning operation between the stamper 2 and the optical element 100 or 200 by using a predetermined point (reference mark). Also, it is possible to simplify the positioning operation, and to improve the positioning precision.

In addition, in the apparatus 1 for manufacturing the optical element, the transfer portion 2a of the stamper comes into contact with the transferred surface 101b or 201b of the optical element 100 or 200 or moves close thereto, and the positioning operation between the center of the transfer portion 2a of the stamper 2 and the center of the transferred surface 101b or 201b of the optical element 100 or 200 is performed.

Accordingly, it is possible to improve the positional precision between the stamper 2 and the optical element 100 or 200.

In addition, in the apparatus 1 for manufacturing the optical element, in the state where the positioning operation between the center of the transfer portion 2a of the stamper 2 and the center of the transferred surface 101b or 201b of the optical element 100 or 200 is performed, and the stamper 2 moves closer to the optical element 100 or 200 so as to gradually change the curvature of the transfer portion 2a and to transfer the shape of the transfer portion 2a to the transferred surface 101b or 201b.

Accordingly, since the shape of the transfer portion 2a is transferred to the transferred surface 101b or 201b in the state where the positioning operation is performed with high precision, it is possible to improve the molding precision of the optical elements 100 and 200. In addition, since it is possible to prevent air from entering between the transfer portion 2a and the transferred surface 101b or 201b during the transfer operation, it is possible to improve the molding precision.

Further, in the apparatus 1 for manufacturing the optical element, since the curvature of the portion 2b of the stamper 2 is changed by changing the pressure in the hermetic space 10 formed between the stamper 2 and the stamper holding mechanism 3, it is possible to easily change the curvature of the portion 2b, and to improve the operation efficiency during the manufacturing operation.

Furthermore, since the curvature of the portion 2b of the stamper 2 is changed by changing the pressure in the hermetic space 10, it is possible to apply uniform pressure to the entire region of the portion 2b. Accordingly, it is possible to easily and reliably obtain a desired curvature of the portion 2b.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus for manufacturing an optical element, comprising:
a flexible stamper having a transfer portion transferring a predetermined shape and having changeable curvature;
a stamper holding mechanism holding the stamper;
an element holding mechanism holding an optical element having a convex or concave curved surface, the curved surface serving as a transferred surface to which the shape of the transfer portion of the stamper is transferred;
a curvature changing mechanism changing the curvature of the stamper in accordance with curvature of the transferred surface of the optical element; and
a moving mechanism moving at least one of the stamper held by the stamper holding mechanism and the optical element held by the element holding mechanism in a direction in which the transfer portion of the stamper moves away from or closer to the transferred surface of the optical element.

2. The apparatus according to claim 1,
wherein the transferred surface of the optical element is formed in a concave shape, and
wherein the curvature of the transfer portion is set to be larger than that of the transferred surface in the state before the transfer portion of the stamper comes into contact with the transferred surface of the optical element so as to transfer the shape of the transfer portion to the transferred surface.

3. The apparatus according to claim 1,
wherein the transferred surface of the optical element is formed in a convex shape, and
wherein the curvature of the transfer portion is set to be smaller than that of the transferred surface in the state before the transfer portion of the stamper comes into contact with the transferred surface of the optical element so as to transfer the shape of the transfer portion to the transferred surface.

4. The apparatus according to claim 2,
wherein the transfer portion of the stamper comes into contact with the transferred surface of the optical element or moves close thereto, and a center of the transfer portion of the stamper is aligned to a center of the transferred surface of the optical element.

5. The apparatus according to claim 3,
wherein the transfer portion of the stamper comes into contact with the transferred surface of the optical element or moves close thereto, and a center of the transfer portion of the stamper is aligned to a center of the transferred surface of the optical element.

6. The apparatus according to claim 4,
wherein in the state where the center of the transfer portion of the stamper is aligned to the center of the transferred surface of the optical element, the stamper and the optical element move closer to each other, and the transfer portion of the stamper is pressed down against the transferred surface of the optical element so as to gradually change the curvature of the transfer portion and to transfer the shape of the transfer portion to the transferred surface.

7. The apparatus according to claim 5,
wherein in the state where the center of the transfer portion of the stamper is aligned to the center of the transferred surface of the optical element, the stamper and the optical element move closer to each other, and the transfer portion of the stamper is pressed down against the transferred surface of the optical element so as to gradually change the curvature of the transfer portion and to transfer the shape of the transfer portion to the transferred surface.

8. The apparatus according to claim 1,
wherein a hermetic space is formed between the stamper and the stamper holding mechanism, and
wherein the curvature of the transfer portion of the stamper is changed by changing a pressure in the hermetic space.

9. A method of manufacturing an optical element, comprising the steps of:
forming a flexible stamper having a transfer portion transferring a predetermined shape and having changeable curvature;
disposing the stamper held by a stamper holding mechanism so that the transfer portion thereof faces a transferred surface formed as a convex and concave curved surface of an optical element held by an element holding mechanism;
changing the curvature of the stamper in accordance with curvature of the transferred surface of the optical element by using a curvature changing mechanism;
moving at least one of the stamper and the optical element in a direction in which the transfer portion and the transferred surface move closer to each other by using a moving mechanism; and
transferring the shape of the transfer portion to the transferred surface by pressing down the transfer portion of the stamper against the transferred surface of the optical element.

* * * * *